US008660538B2

(12) United States Patent
Rysenga et al.

(10) Patent No.: US 8,660,538 B2
(45) Date of Patent: Feb. 25, 2014

(54) METHOD OF COMMUNICATING BUSINESS CONTACT INFORMATION TO A WIRELESS USER

(75) Inventors: Jeffrey P. Rysenga, Berkley, MI (US); Steven P. Schwinke, Plymouth, MI (US)

(73) Assignee: General Motors LLC, Detroit, MI (US)

( * ) Notice: Subject to any disclaimer, the term of this patent is extended or adjusted under 35 U.S.C. 154(b) by 906 days.

(21) Appl. No.: 12/341,749

(22) Filed: Dec. 22, 2008

(65) Prior Publication Data

US 2010/0159894 A1 Jun. 24, 2010

(51) Int. Cl.
*H04Q 5/22* (2006.01)
*H04M 3/42* (2006.01)

(52) U.S. Cl.
USPC ............... 455/412.1; 455/414.1; 340/10.1

(58) Field of Classification Search
USPC ............. 455/414, 415, 435, 466; 705/44, 64; 709/200; 340/10
See application file for complete search history.

(56) References Cited

U.S. PATENT DOCUMENTS

| 6,763,336 | B1 * | 7/2004 | Kolls | 705/44 |
| 2005/0085221 | A1 * | 4/2005 | Sumcad | 455/415 |
| 2005/0131837 | A1 * | 6/2005 | Sanctis et al. | 705/64 |
| 2006/0250578 | A1 * | 11/2006 | Pohl et al. | 351/210 |
| 2007/0168418 | A1 * | 7/2007 | Ratnakar | 709/204 |
| 2007/0232279 | A1 * | 10/2007 | Sjogren et al. | 455/414.1 |
| 2008/0021964 | A1 * | 1/2008 | Inbarajan | 709/206 |
| 2008/0207203 | A1 * | 8/2008 | Arthur et al. | 455/435.1 |

OTHER PUBLICATIONS

Free Text Messaging, http://web.archive.org/web/20060615125011/http://www.onlinetextmessage.com/, Jun. 15, 2006.*

* cited by examiner

*Primary Examiner* — Kashif Siddiqui
(74) *Attorney, Agent, or Firm* — Anthony Luke Simon; Reising Ethington P.C.

(57) ABSTRACT

A method for providing business services to a customer via a wireless device used by the customer. The method includes asking a customer for a wireless telephone number associated with a wireless device used by the customer, receiving the wireless telephone number, storing the wireless telephone number, and sending the customer a short message service (SMS) message to the wireless telephone number, wherein the SMS message contains a phone number or universal resource locator (URL) that allows the customer to use the wireless device to interact with the business.

17 Claims, 2 Drawing Sheets

METHOD OF COMMUNICATING BUSINESS CONTACT INFORMATION TO A WIRELESS USER

TECHNICAL FIELD

The present invention relates generally to wireless messaging and more particularly to wirelessly sending messages from a business to a customer.

BACKGROUND OF THE INVENTION

Businesses utilize a variety of different approaches to encourage and assist customers in consuming the business's goods and/or services. Whether the goods and/or services can be consumed at a storefront, mail order, over the phone, or through a web portal, a customer must know how to communicate with the business. Storefront addresses, web portal universal resource locators, and telephone numbers are all different types of business contact information that the customer can use to communicate with a business. And businesses inform the customer about their contact information using a variety of advertising media. For instance, businesses purchase radio and television advertising time during which a website address, storefront address, or telephone number can be recited in order to increase the number of customers that purchase products. But when a business advertises using these methods, the business relies on the customer to direct his attention to the advertisement and then to record the communication information for use at a later time. Or in other words, the business relies on customer participation. However, in some situations, this reliance can be inefficient. Customers may not hear the information in the advertisement. Alternatively, they may forget to write down the contact information or incorrectly write down the information.

SUMMARY OF THE INVENTION

According to an aspect of the invention, a method involves providing business services to a customer via a wireless device used by the customer. The method includes asking a customer for a wireless telephone number associated with a wireless device used by the customer, receiving the wireless telephone number, storing the wireless telephone number, and sending the customer a short message service (SMS) message to the wireless telephone number, wherein the SMS message contains a phone number, universal resource locator (URL), or other business contact information that allows the customer to use the wireless device to interact with the business.

According to another aspect of the invention, a method includes providing business services to a customer via a wireless device used by the customer. The method includes obtaining a wireless telephone number associated with a wireless device used by a customer, and automatically sending an SMS message to the wireless device associated with the wireless telephone number. The SMS message includes a phone number or a URL capable of allowing the wireless device to contact the business. The method also includes receiving the message at the wireless device, extracting the phone number or URL from the message at the wireless device, saving the phone number or URL used for interacting the business at the wireless device, and interacting with the business using the phone number or URL.

According to yet another aspect of the invention, a method involves providing business services to a customer via a wireless device used by the customer. The method includes sending a customer an email that contains a URL linking the customer to a web portal of a business to a customer, receiving a wireless telephone number at the web portal, sending an SMS message including the URL to a wireless device associated with the wireless telephone number, receiving the SMS message at the wireless device, accessing the web portal using the wireless device and the URL included with the SMS message, and controlling a function related to the operation of a vehicle using customer input received via the wireless device at the web portal.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT

Figure 1:
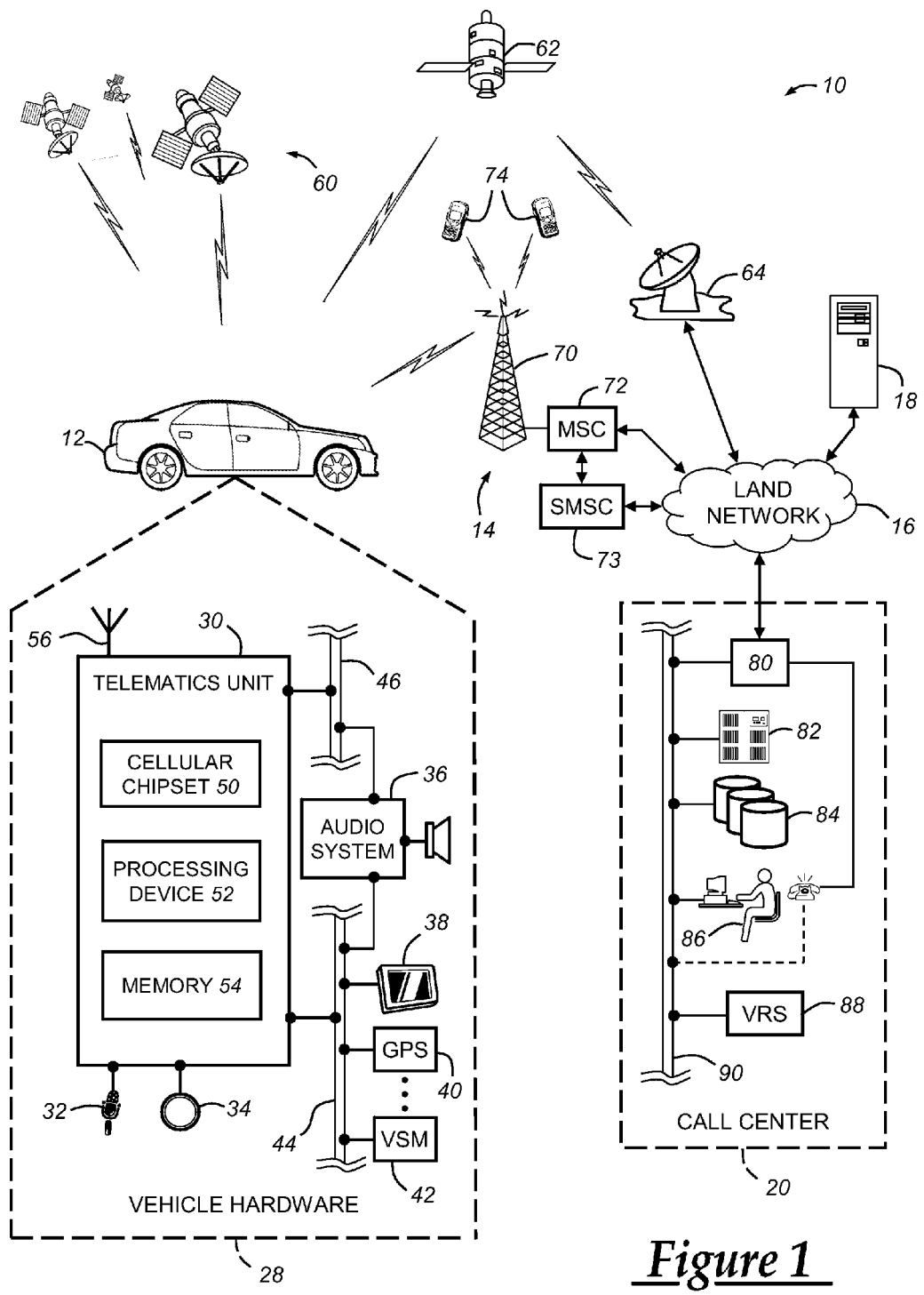
FIG. 1 is a block diagram depicting an exemplary embodiment of a communications system that is capable of utilizing the method disclosed herein.
Figure 2:
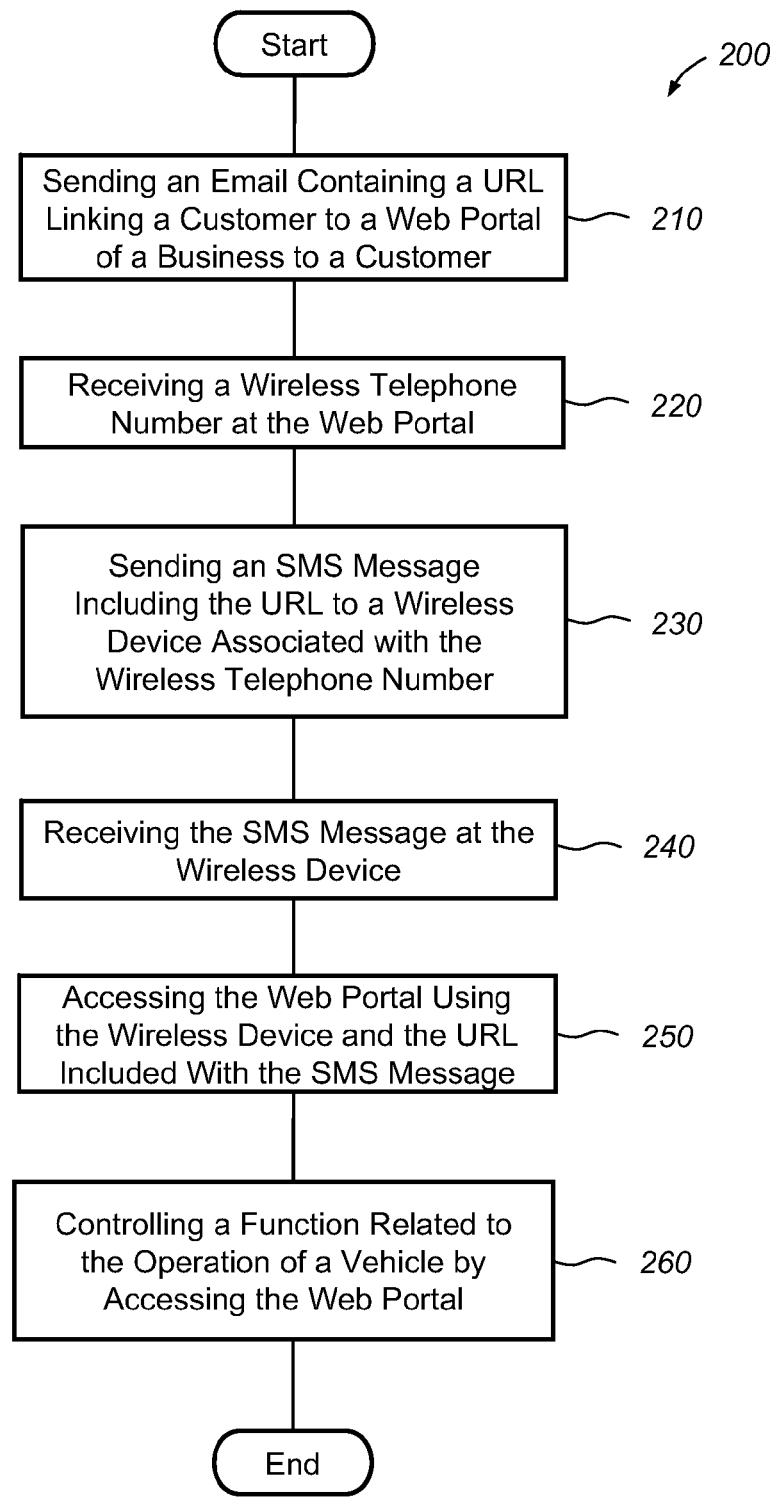
FIG. 2 is a flow chart depicting an embodiment of the method disclosed herein.

The specific method described below in connection with FIGS. 1 and 2 is directed to an embodiment of a method of providing business services to a customer via a wireless device used by a customer. Presently, many customers (or potential customers) have and use wireless devices. While businesses still use advertisements to inform the customers of communication information, an SMS message that includes communication information can be sent to a wireless device. When the customer receives the SMS message, contact information, such as a URL or phone number, can be saved in the wireless device for later use. Saving the contact information in the wireless device can help the business provide a wide variety of services to the customer. For instance, the customer can receive an SMS that includes contact information and use the contact information to contact the business using the wireless device that dials a telephone number or directs its web browser to the Universal Resource Locator (URL) of the business website. Alternatively, in one embodiment of the present method, the customer can use the contact information to control a function of a vehicle. This can be used, for instance, for a customer who has a vehicle equipped with a vehicle telematics unit, but may not easily remember the contact number of the telematics service. In this case, the user can receive an SMS message that includes the telephone number or the URL of the telematics service. After receiving the SMS message including the contact information, the user's wireless device can save the telephone number or URL at the wireless device. And when the user wants to contact or control a function related to the operation of a vehicle they can call a call center associated with the telematics service or they can access the web portal of the telematics service. In either case, the user can, either orally or through a web browser, direct the telematics service to perform some vehicle function. Examples of these functions include unlocking/locking vehicle doors, honking the vehicle's horn, flashing the vehicle's lights, directing the vehicle to upload the vehicle's diagnostic data, or speaking with a vehicle advisor.

Communications System—

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a visual display 38, and a GPS module 40 as well as a number of vehicle system modules (VSMs) 42. Devices can be indirectly connected to the telematics unit 30 using one or more network connections, such as a communications bus 44. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is an OEM-installed device that enables wireless voice and/or data communication over wireless carrier system 14 and via wireless networking so that the vehicle can communicate with call center 20, other telematics-enabled vehicles, or some other entity or device. The telematics unit 30 preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle 12 to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, AMPS, 3G, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit 30 to provide a wide variety of services. For instance, processor 52 can execute programs or process data to carry out at least a part of the method discussed herein. Telematics unit 30 can also use the processor 52 for preparing, receiving, and sending short-message service (SMS) messages. SMS messages, also now known more generically as "text messaging," involve sending alphanumeric or other characters to or from wireless devices. Originally used with a GSM mobile network, SMS messages can now be sent over nearly every network protocol such as CDMA, AMPS, and other protocols. SMS messages can originate at the vehicle 12 where telematics unit 30 can generate the SMS message using processor 52 and send the SMS message using the cellular chipset 50. The chipset 50 sends the SMS message via the wireless carrier system 14 to a short message system center (SMSC) 73. The SMSC 73 is responsible for handling the SMS messages for the wireless carrier system 14 and forwards the messages to the intended recipient (e.g. wireless device). Similarly, the telematics unit 30 can receive SMS messages from the wireless carrier system 14 via the antenna 56 and read SMS messages using the processor 52.

The telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the GPS module 40, the vehicle 12 can include other vehicle system modules (VSMs) 42 in the form of electronic hardware components that are located throughout the vehicle and typically receive input from one or more sensors or the telematics unit 30 and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As an example, one VSM 42 can be a body control module that governs various electrical components located throughout the vehicle, like the vehicle's power door locks and headlights. In another example, a VSM 42 can include an engine control module. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including visual display 38. As used herein, the term 'vehicle user interface' broadly includes any suitable form of electronic device, including both hardware and software components, which is located on the vehicle and enables a vehicle user to communicate with or through a component of the vehicle. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, a short message service center (SMSC) 73, as well as any other networking components required to connect wireless carrier system 14 with land network 16. Each cell tower 70 includes sending and receiving antennas and a base station, with the base stations from different cell towers being connected to the MSC 72 and SMSC 73 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC/SMSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements. The wireless carrier system 14 also involves communication with wireless devices 74 within range of cell towers 70. Wireless devices 74 can include devices capable of receiving SMS messages. For instance, examples of wireless devices 74 are cellular phones, personal digital assistants (PDAs), text pagers, and personal computers capable of receiving SMS messages.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

SMS Messaging Method—

Turning now to FIG. 2, there is shown a method 200 of providing business services to a customer via a wireless device used by the customer. The method 200 starts at block 210 and begins with sending an email to the customer containing a universal resource locator (URL) linking the customer to a web portal of a business. A URL, also commonly referred to as a web address, is a string of numbers and/or letters that identifies and provides a mechanism for accessing the web page of a particular business or organization. The string principally includes a domain name or host name that can be translated into an IP address via a domain name server (DNS) resolver. The customer can receive the URL via an email in which the URL, or web address, is embedded in the subject line or body of the email. Businesses can obtain the email addresses of customers or potential customers in order to send the customers email in a variety of ways. In one example, the customer or potential customer can provide his email address to the business. For instance, a business, such as a telematics service provider can obtain a customer's email address when the customer enrolls in a subscription service or when the customer begins receiving service from the business. In another example, the business can receive lists of potential customers and send emails to the customers informing them of the services or goods the business offers. The email can include the URL as a means for the customer to contact the business for further inquiry. The URL can link the customer to the business' web portal. The web portal, or website, provides a place for information and interaction between the customer and the business on the World-Wide Web (WWW). The web portal can take a variety of forms. For instance, the web portal can provide information to customers or the portal can provide information and interact with the customer. Interaction with the customer can include receiving data, such as wireless telephone numbers, or questions from the customer. The web portal can be owned or registered by the business or the web portal can be associated with the business by being owned by another entity while providing information and interactive services on behalf of the business. The method 200 then proceeds to step 220.

At step 220, a wireless telephone number is received at the web portal. Once the customer links to the web portal, the customer can provide the wireless telephone number. The wireless telephone number, or cell phone number, can be a telephone number that is associated with a customer's wireless device 74. In short, if a person or business dials the wireless telephone number, they would be able to speak with the customer through the customer's wireless device 74. Other information can be received at the web portal along with the wireless telephone number. If a customer wishes to establish an account or more involved relationship with the business or has already established an account, the customer can include other identifying information. For instance, if the customer has previously established an account with the business, the customer can provide additional identifying information, such as the name of the wireless service provider and/or the zip code of the address where the wireless service provider sends the customer its bill. Doing so can identify the customer to the web portal. It can also establish the identity of the wireless carrier that provides data services for SMS messaging.

In another example, the wireless telephone number could be an email address unique to the wireless device so that an SMS message can be sent to the customer's wireless device. The use of email-to-SMS conversion involves receiving an email sent to a unique email address associated with a wireless device and taking the body (message contents) of the email and putting it into an SMS message that is sent to the wireless device. Servers that perform this function are known. Regardless of whether the wireless telephone number is a string of digits or an email address, the number is received at the web portal. In one example, the web portal presents the customer with a blank field into which the customer can enter the wireless telephone number using the keypad on the wireless device 74 or using a keyboard attached to computer 18. After entering the wireless telephone number as a string of digits or email address, the user can type or paste it into an entry field on the web portal and then press the enter key or depress a radio button with a pointer device, such as a mouse, controlling a graphical-user interface. The wireless telephone number can be received at a variety of locations. In one example, the wireless telephone number is received at the call center 20. The method 200 then proceeds to step 230.

Once the wireless telephone number is obtained by or on behalf of the business, then at step 230, a short message service (SMS) message is sent, including the URL to a wireless device 74 associated with the wireless telephone number. The first step in this is to create or access a pre-stored SMS message. The SMS message contains business contact information for the business in the form of a phone number or URL. Other information can be included as well. The URL can direct the customer to the web portal of the business. In another example, the URL can direct the customer to a web portal that is specifically configured to provide information to customers using a wireless device 74. The SMS message can be sent from the call center 20 or any other location in communication with the land network 16 and/or the SMSC 73. The method 200 then proceeds to step 240.

At step 240, the SMS message is received at the wireless device. The wireless device 74 can receive the SMS message and use the information included with the SMS message. For example, the wireless device 74 can receive the SMS message and extract the URL from the body of the message. When the URL is extracted, the wireless device 74 can begin a variety of functions. The wireless device 74, if so equipped, can save the URL in a memory device located with the wireless device 74. Also, the wireless device 74 can open a web browser that uses the URL to navigate the web browser to the underlying web portal of the URL. It is also possible that the web browser can save the URL as a bookmark or in a function of the browser reserved for the user's favorite webpages for later use. The method 200 proceeds to step 250.

At step 250, the web portal is accessed using the wireless device and the URL included with the SMS message. Once the customer has the URL in the received SMS message, saved in memory in the wireless device 74, or saved as a bookmark in the wireless device's web browser, the customer can access the web portal. When the customer does access the portal, information can be exchanged between the wireless device 74 and the web portal. In one example, the web portal provides a phone number to the wireless device 74 with which the customer can contact the business. The wireless device 74 can automatically save the phone number and the name of the business in an address book of the wireless device. So later, when the customer desires to contact the business, the phone number is conveniently saved in the address book, phone book, or other memory device located with the wireless device 74. The method 200 proceeds to step 260.

At step 260, a function related to the operation of a vehicle is controlled by accessing the web portal. Examples of functions related to the operation of a vehicle include locking or unlocking the doors of the vehicle 12, flashing the exterior or interior lights of the vehicle 12, honking the horn of the vehicle 12, controlling the GPS module 40, or requesting a vehicle diagnostic upload. The vehicle diagnostics upload can include DTCs, OBD data, or other data received from VSMs 42. During the vehicle diagnostics upload, the DTCs, OBD data, or other data received from VSMs 42 can be transmitted from the vehicle 12 to the call center 20. The customer can also control the VSMs 42 described above through the web portal. The above-described functions can be controlled at the call center 20 by the customer through the web portal. If desired for security purposes, the call center 20 can request the customer enter a multi-digit security code before carrying out functions relating to the operation of the vehicle. The method 200 then ends.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of providing business services to a customer via a wireless device used by the customer, comprising the steps of:
   (a) enrolling a customer in a telematics service subscription;
   (b) receiving an email address from the customer during telematics subscription enrollment;
   (c) sending an email to the received email address comprising a universal resource locator (URL) linking the customer to business services;
   (d) receiving a wireless telephone number from the customer enrolled in the telematics service subscription via a website identified by the URL, wherein the wireless telephone number comprises a wireless email address;
   (e) initiating an email to the wireless telephone number;
   (f) converting the email to a short message service (SMS) message; and
   (g) sending the SMS message to the wireless device.

2. The method of claim 1, further comprising the step of controlling a function relating to the operation of the vehicle in response to customer input via the website.

3. The method of claim 2, wherein the function relating to the operation of a vehicle comprises: locking the doors of the vehicle, unlocking the doors of the vehicle, flashing the lights of the vehicle, honking the horn of the vehicle, controlling a vehicle navigation system, or requesting a vehicle diagnostic upload.

4. The method of claim 1, further comprising the step of asking the customer to choose a wireless service provider that will provide data service for the SMS message.

5. The method of claim 1, wherein step (b) further comprises receiving the wireless telephone number at a vehicle call center.

6. A method of providing business services to a customer via a wireless device used by the customer, comprising the steps of:
   (a) obtaining a wireless telephone number associated with a wireless device used by the customer;
   (b) automatically sending a short message service (SMS) message to the wireless device associated with the wireless telephone number, wherein the SMS message includes a phone number or a universal resource locator (URL) capable of allowing the wireless device to contact a business;
   (c) receiving the message at the wireless device;
   (d) extracting the phone number or URL from the message at the wireless device;
   (e) saving the phone number or URL used for interacting the business at the wireless device; and
   (f) opening a website of the business at the wireless device using the saved URL;
   (g) providing the name of the wireless service provider and the zip code of a billing address associated with the wireless device to the website using the opened website.

7. The method of claim 6, further comprising the step of controlling a function relating to the operation of a vehicle in response to customer input via the phone number or website.

8. The method of claim 7, wherein the function relating to the operation of a vehicle includes: locking the doors of the vehicle, unlocking the doors of the vehicle, flashing the lights of the vehicle, honking the horn of a vehicle, controlling a vehicle navigation system, or requesting a vehicle diagnostic upload.

9. The method of claim 6, wherein step (a) further comprises providing the wireless telephone number to a vehicle call center.

10. The method of claim 6, further comprising the steps of: using the phone number to contact a vehicle call center; and requesting the vehicle call center control a function relating to the operation of the vehicle.

11. The method of claim 6, wherein step (a) further comprises providing the wireless telephone number to a business at a web portal.

12. A method of providing business services to a customer via a wireless device used by the customer, comprising the steps of:
  (a) sending an email to a customer, wherein the email contains a universal resource locator (URL) linking the customer to a web portal of a telematics service provider that is capable of receiving inputs from the customer that result in the control of functions related to the operation of a vehicle;
  (b) receiving a wireless telephone number at the web portal;
  (c) sending a short message service (SMS) message including the URL to a wireless device associated with the wireless telephone number;
  (d) receiving the SMS message at the wireless device;
  (e) accessing the web portal of the telematics service provider using the wireless device and the URL included with the SMS message such that the web portal of the telematics service provider is displayed at the wireless device; and
  (f) controlling a function related to the operation of a vehicle using customer input received via the web portal of the telematics service provider displayed at the wireless device and ultimately communicated from the wireless device to the web portal.

13. The method of claim 12, wherein the function related to the operation of the vehicle comprises: locking the doors of the vehicle, unlocking the doors of the vehicle, flashing the lights of the vehicle, honking the horn of the vehicle, controlling a vehicle navigation system, or requesting a vehicle diagnostic upload.

14. The method of claim 12, wherein step (f) further comprises controlling the function from a vehicle call center.

15. The method of claim 12, further comprising the step of forwarding the wireless telephone number from the web portal to a vehicle call center.

16. The method of claim 12, further comprising the step of saving a password at the wireless device for controlling the function.

17. The method of claim 12, wherein the URL is saved at the wireless device.

* * * * *